United States Patent
Guerin

[11] Patent Number: 5,829,183
[45] Date of Patent: Nov. 3, 1998

[54] ARTIFICIAL BAIT

[76] Inventor: John W. Guerin, 5314 Vincennes, Arlington, Tex. 76017

[21] Appl. No.: 724,770

[22] Filed: Oct. 3, 1996

[51] Int. Cl.⁶ ................................................... A01K 85/00
[52] U.S. Cl. ...................... 43/42.35; 43/42.31; 43/42.02; 43/42.48; 43/42.15; 43/42.36
[58] Field of Search ............................... 43/42.02, 42.15, 43/42.47, 42.48, 42.31, 42.35, 42.36, 42

[56] References Cited

U.S. PATENT DOCUMENTS

| 803,134 | 10/1905 | Rhodes | 43/42.02 |
|---|---|---|---|
| 1,849,434 | 3/1932 | Page | 43/42.02 |
| 2,069,972 | 2/1937 | Schroeder | 43/42.15 |
| 2,184,031 | 12/1939 | Wyatt | 43/42.48 |
| 2,290,433 | 7/1942 | Jeffers | 43/42 |
| 2,312,585 | 3/1943 | Piro, Jr. | 43/46 |
| 2,519,236 | 8/1950 | Dudley | 43/42.36 |
| 2,535,392 | 12/1950 | Dale | 43/42.15 |
| 2,613,471 | 10/1952 | Traycik | 43/42.48 |
| 2,663,964 | 12/1953 | Martin | 43/42.02 |
| 2,791,859 | 5/1957 | Wentworth | 43/42.02 |
| 2,910,799 | 11/1959 | Wentworth | 43/42.02 |
| 2,965,997 | 12/1960 | Leonard | 43/42.48 |
| 3,218,750 | 11/1965 | Lewin | 43/42.36 |
| 3,284,944 | 11/1966 | Settle | 43/42.15 |
| 3,438,144 | 4/1969 | Lincoln | 43/42.15 |
| 3,456,378 | 7/1969 | Adams | 43/42.48 |
| 4,208,822 | 6/1980 | Bryant | 43/42.02 |
| 4,796,379 | 1/1989 | Rabideau | 43/42.48 |
| 5,035,075 | 7/1991 | Pearce | 43/26.2 |
| 5,088,227 | 2/1992 | Toner et al. | 43/42.3 |
| 5,406,738 | 4/1995 | Holleman | 43/42.15 |

Primary Examiner—Kurt Rowan
Attorney, Agent, or Firm—Steven W. Smith

[57] ABSTRACT

An artificial bait is provided which accurately simulates a wounded or dying natural prey of game fish. The bait includes an upper lure body section having a weighted bill, an interior channel for receiving a fishing line and a vertical channel for retaining a hook support wire, a lower tail section having a tail actuator mechanism, and a hinge mechanism. The tail actuator mechanism includes an actuator wire having a tying eye at each end and a counterweight in the proximity of one end. Operation of the invention causes the bill to dip and rise in the water as the tails moves between a horizontal and vertical position, and the lure stays suspended without moving forward. Cranking the bait forward causes the body of the lure to wobble through the water, similar to an injured fish, unable to right itself.

19 Claims, 3 Drawing Sheets

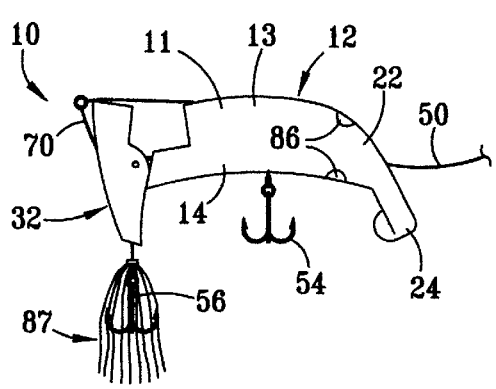
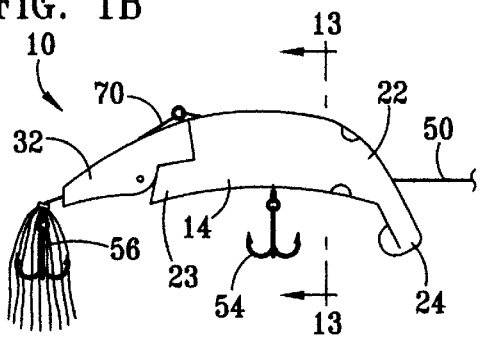
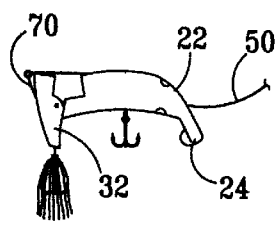
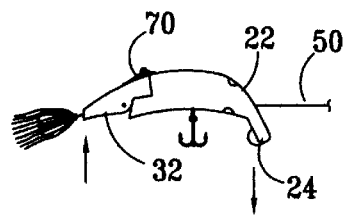
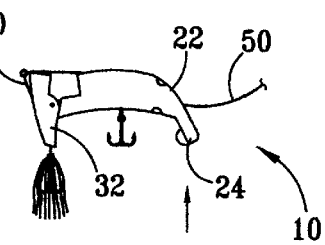
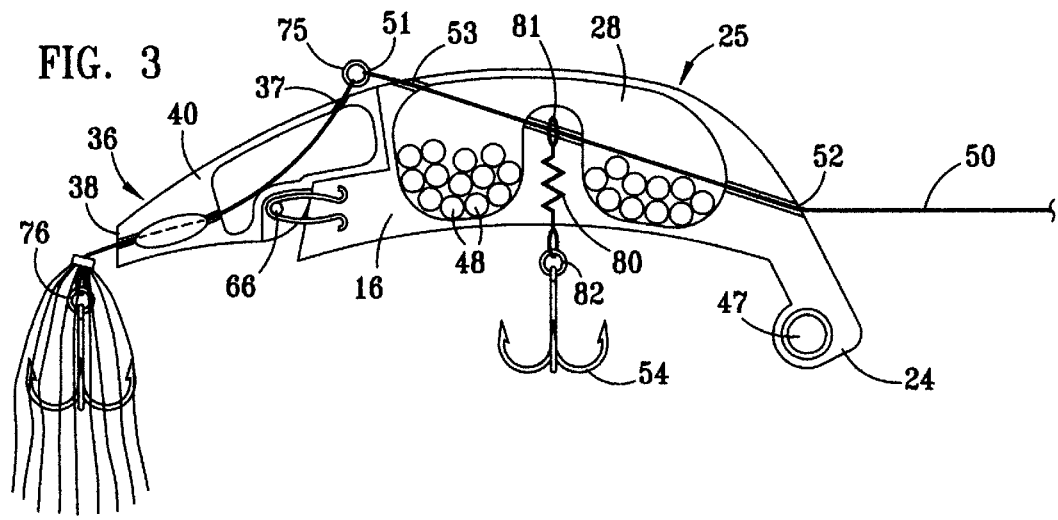
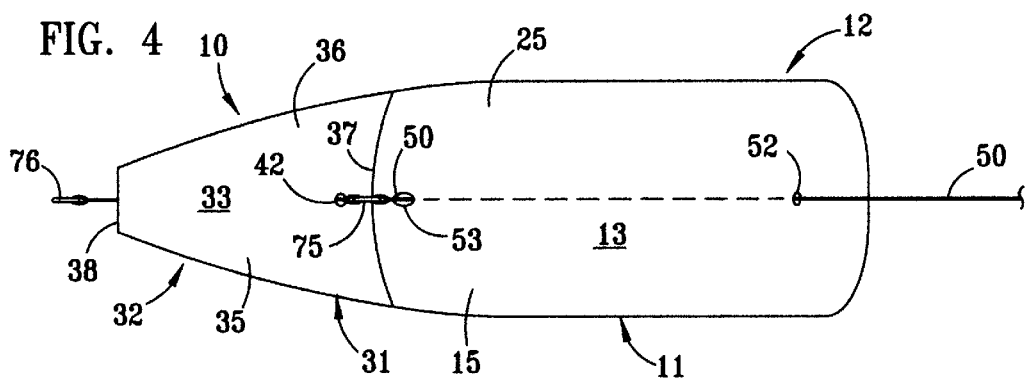

ARTIFICIAL BAIT

BACKGROUND OF THE INVENTION

1. Field of the Invention

This invention relates to artificial bait, and, more particularly, to top water and suspended fishing lures for attracting game fish such as bass.

2. Description of Related Art

Artificial bait simulating natural or live species such as insects, amphibians, and fish are well known. These lures include animated lures useful in casting and suspended fishing methods, imitating the movements of the live natural prey of game fish. In nature however, game fish are more readily attracted to a freshly wounded or injured live species, since the injured species may be easier to catch. Unlike a healthy prey, an injured or dying fish will typically struggle on its side, at or below the water's surface, attempting to right itself and continue swimming. Often, an injured bait fish, such as a shad, will try to right itself by flipping its tail up. If unsuccessful, the head dips down as the tail flips up and the fish can neither right itself nor move in a forward direction. If the injured prey does successfully swim, it often remains tipped on its side as it wobbles forward through the water.

Although there are no known prior art teachings of an artificial bait which accurately simulates a wounded or dying prey, a number of prior art references exist that discuss subject matter that bears some relation to the information disclosed herein. Such prior art references are U.S. Pat. Nos. 803,134; 1,849,434; 2,290,433; 2,312,585; 2,663,964; 2,791,859; 2,965,997; 3,456,378; 4,208,822; 5,035,075; and 5,088,227. Each of these references is discussed briefly below.

U.S. Pat. No. 803,134 to Rhodes relates to a fishing lure which attempts to imitate a live bait species having a body and legs such as a frog. The Rhodes bait includes a rod placed longitudinally through the body of the bait, having a spring and a cross-piece at one end adapted to hold the rod in a rearward position, engaging the legs. U.S. Pat. No. 1,849,434 to Page relates to a fishing lure, preferably resembling a frog, including an upper body portion having an actuating link within, and a lower portion hinged to the upper body, normally hanging down from the upper body in a vertical position. One end of the actuating link is connected to the end of a fishing line and another end is connected to the lower portion with a hinge and hinge wire, such that when the line is pulled, the link swings the lower portion from the vertical position to a horizontal position in line with the upper body. U.S. Pat. No. 2,290,433 to Jeffers discloses a lure designed to simulate the appearance and natural action of live bait in the water such as the swimming movements of hellgrammite. The Jeffers' lure includes a flexible, opaque body having a fishing line attached to the head end on a swivel and to the tail end through a narrow slot in a substantially transparent agitator. A series of jerks to the line causes the lure to flex and bend longitudinally only, with the lateral movement being precluded by the narrow slot.

U.S. Pat. No. 2,312,585 to Piro discloses a casting lure designed to simulate a live insect or crippled minnow. The Piro lure includes at least one buoyant movable hinged member attached to the weighted main body member. U.S. Pat. No. 2,663,964 to Martin discloses an artificial bait resembling a live shrimp, designed to move backward by alternatively arching and straightening out the segmented body. Similarly, the shrimp lure of U.S. Pat. No. 2,791,859 to Wentworth uses a plurality of hinged body segments, having a compression spring and an actuating member extending through the spring for imparting a rolling, skipping or yawing motion to the bait.

U.S. Pat. No. 2,965,997 to Leonard discloses a casting lure designed to have a spiral movement when drawn through the water. The Leonard lure includes a curvelinear body having a relatively stiff lead wire connected at the forward end. U.S. Pat. No. 3,456,378 to Adams relates to a fishing lure simulating an injured minnow, designed to float on its side when at rest and to submerge and swim with a rolling, wriggling action during retrieval.

U.S. Pat. No. 4,208,822 to Bryant discloses a lure designed to simulate the movements and sounds of a squid as it advances through the water. The Bryant lure includes a massive head and at least one collapsible intermediate section, connected to an elongate wire. During use, pulling on the fishing line causes the tail end of the lure to move toward the head and collapse the intermediate section, before the head moves forward through the water.

U.S. Pat. No. 5,035,075 to Pearce discloses a mechanically driven lure including a windup mechanism having a coil spring for actuating the lure forward through the water in simulation of live bait such as a frog, fish or insect. U.S. Pat. No. 5,088,227 to Toner et al, discloses a simulated frog fishing lure including a rigid body portion having two flexible legs. Rods and springs are mounted within the body and leg portions to actuate movement of the legs in simulation of a swimming frog.

Although each of the above prior art references attempt to imitate the natural live or injured prey of game fish, accurate simulation of an injured bait fish such as shad has not yet been achieved. Therefore, there remains a need in the art for an artificial bait which imitates the movements of an injured or dying prey for luring game fish. The present invention meets this need.

SUMMARY OF THE INVENTION

It is an object of the present invention to provide an artificial bait which accurately simulates a wounded or dying natural prey of game fish. In accordance with one embodiment of the invention, the lure includes an upper body section having a weighted bill, a lower tail section having an actuator mechanism, and a hinge mechanism. The upper body section includes an exterior surface, an interior, a right side having an interior right face defining a partially hollow right interior, a left side having an interior left face defining a partially hollow left interior, a top, a bottom, a first head end, and a second hinge end.

The interior right and left faces each have an elongate groove and a vertical groove. The elongate grooves of the adjacent left and right faces form a single line channel extending from the head end to the hinge end for receiving a fishing line through the interior of the upper body section, defining apertures in the exterior surface at the head end and in the proximity of the first hinge end and top.

The adjacent vertical grooves define a single channel for retaining a center hook support wire having an eyelet at a first end and a tying eye at a second end. The eyelet is in the proximity of the line channel such that the section of the fishing line retained within the line channel is threaded through the eyelet. A hook, such as a treble fishing hook, is optionally connected to the tying eye of the hook support wire.

The lower tail section includes an exterior surface, an interior, a right side, a left side, a top, a bottom, a first hinge end, a second tail end and an elongate tail channel extending through the tail interior, defining an aperture proximal to the first hinge end and the top, and a second aperture proximal to the second tail end.

In a preferred embodiment of the invention, the hinge mechanism connects the first hinge end to said second hinge end and includes a hinge pin and two hinge wires. In one aspect, the first hinge end of the body section and the second hinge end of the tail section each have a vertical hinge wire slot. The second hinge end further comprises a horizontal hinge-pin channel extending through the tail interior and tail hinge wire slots, between the left and right sides of the tail section. Each hinge wire is curved such that it has an open end and a loop end. The open end of the left and right hinge wires are fixably retained in the left and right side wire slots of the body section and the loop ends are pivotally retained in the hinge wire slots of the tail section. With the hinge pin disposed within the hinge-pin channel, the hinge wire loops are rotatably secured within the hinge wire tail slots.

In one embodiment of the invention, the actuator mechanism is located within the interior elongate channel of the tail section and includes a wire having a tying eye at the first and second ends and a counterweight therebetween. The first end of the wire extends through the first tail channel aperture, and the second wire end extends through the second tail channel aperture. The end of the fishing line is attached to the first tying eye and a hook is attached to the second tying eye. In addition, the actuator wire passes through the counterweight, which is proximal to the wire's second end. In yet another aspect, the tail hook optionally includes a silicon or rubber skirt to more accurately simulate the tail of a fish.

In another aspect of the present invention, the upper body section has at least one hollow chamber for providing buoyancy, whereas the tail section is optionally hollow or solid. Ballasts are included within the hollow chambers of the upper body section to regulate the floating and sinking depth of the lure. In a preferred embodiment of the present invention the upper body section comprises symmetrical left and right sides. When formed of a hard plastic, each side includes a flat, interior facing surface. When the sections are joined together, the left and right interior faces of the body and tail sections are adjacent to each other, such that the surface grooves match and form the line channel for receiving the fishing line through the body section, the vertical channel for retaining the hook support wire, and two separate hollow interior chambers for buoyancy.

In another aspect of the present invention, the inclusion of the fishing line though the eyelet of the hook support wire keeps the attached central hook on the line, even if the game fish collapses or destroys the lure body. Similarly, attachment of the tail hook to the second tying eye of the actuator wire keeps the hook in connection with the fishing line if the game destroys the tail section of the lure.

In another preferred embodiment of the present invention, the circumference of the substantially conical upper body section is wider at the front end and gradually tapers from the midsection to the hinged second end. Similarly, the lower tail section continues the gradual taper of the lure body, having a wider first hinged end and a narrower second tail end. In another aspect, the cross-sectional top of the upper body portion is arched in a substantially semi-spherical shape which causes the lure to roll over to its upright position when initially cast or moved through the water, simulating a fish laying on its side. In yet another aspect, the curved underside or bottom of the upper body section is slightly concave, which provides for a rocking motion of the lure during small cranks or jerks of the fishing line. The bill weight and tail counterweight are of a mass such that the bill of the lure is heavier than the tail, which prevents forward movement of the lure during non-retrieval actuation of the tail.

In a preferred embodiment of the present invention, the unique body shape and lure design enables the angler to more efficiently attract game fish. When initially cast into the water, the buoyancy chambers and shape of the upper body section cause the lure to roll to an upright position, simulating the appearance of a wounded prey on its side, having a drooping tail. Repeated movement of the tail section between its vertical and horizontal positions is easily accomplished by light jerks on the fishing line to alternatively pull the line taunt and slack. Similar to a wounded fish, the weighted bill of the body section dips down as the tail section is raised to the horizontal position, thereby preventing forward movement of the lure to more accurately simulate the wounded prey. When the angler cranks the lure forward, the shape of the lure's body will cause it to wobble laterally as it passes through the water. Each of these actions can be achieved using the lure at a suspended depth or in top water fishing. The floating and sinking depth of the lure is controlled by the weight and number of ballasts included within the hollow interior chambers. Additionally, the ballasts, as well as the weight in the bill, will rattle to create a game attention sound as the lure is moved in the water.

BRIEF DESCRIPTION OF THE DRAWINGS

The invention will be better understood and its numerous objects and advantages will become more apparent to those skilled in the art by reference to the following drawing, in conjunction with the accompanying specification, in which:

FIG. 1A is a side elevation view of the fishing lure of the present invention depicting the fishing line slack and the tail section in its vertical, relaxed position;

FIG. 1B is a side elevation view of the fishing lure of FIG. 1A depicting the fishing line taunt and the tail section in its horizontal, raised position;

FIGS. 2A–C are right side elevation views of the fishing lure of the present invention, having arrows indicating the directional motion of the tail and body sections when the fishing line is changed from its slack state of FIG. 2A, to a taunt state of FIG. 2B and returned to its slack state of FIG. 2C;

FIG. 3 is a vertical section view of the present invention, showing the internal structure of the lure with the tail section in the raised position;

FIG. 4 is a top plan view of the present invention depicting the exit and entry points of the fishing line and actuator wire, having the internal portion of the fishing line shown in phantom;

DESCRIPTION OF THE PREFERRED EMBODIMENTS

Figure 5:
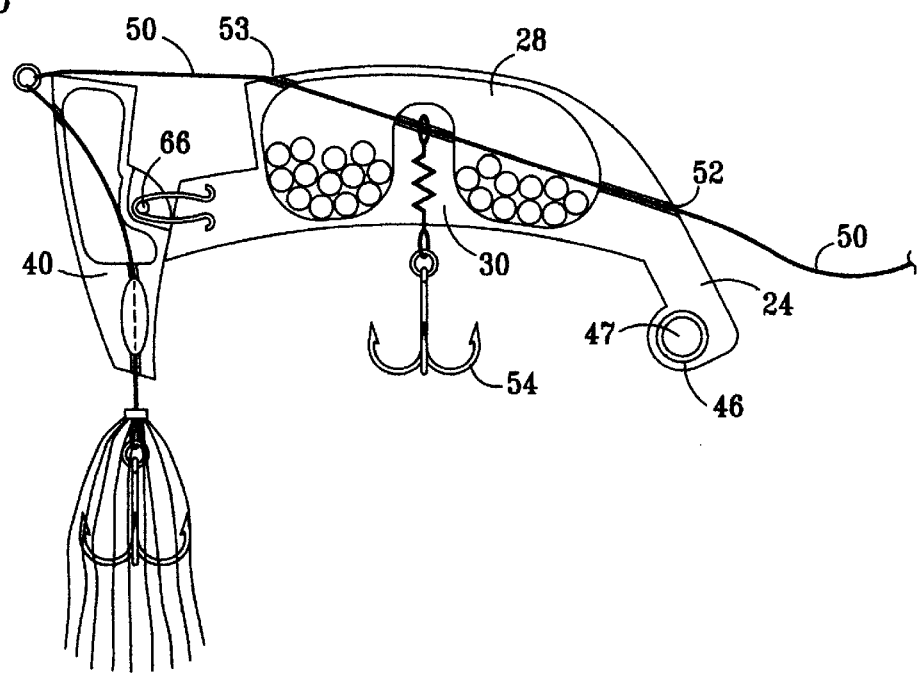
FIG. 5 is a vertical section view of the present invention, showing the internal structure of the lure with the tail section in its lowered position.
Figure 6:
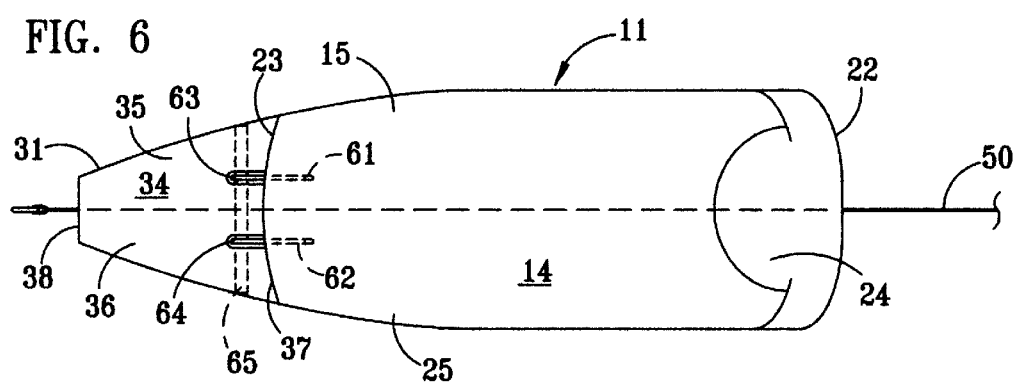
FIG. 6 is a bottom plan view of the present invention, depicting the point of attachment between the upper body and tail sections, having the connection pin and internal path of the fishing line and actuator wire shown in phantom.

Referring to FIGS. 1A–1B, 4 and 6, the present invention is an artificial bait 10 for luring game fish having an upper body section 12, a lower tail section 32, and an actuator mechanism 70. Upper body section 12 includes an exterior surface 11, a right side 15, a left side 25, a top 13, a bottom 14, a first head end 22, and a second hinge end 23. Lower tail section 32, includes an exterior surface 31, a right side 35, a left side 36, a top 33, a bottom 34, a first hinge end 37, and a second tail end 38. In FIG. 1A, tail section 32 is shown in its vertical position when fishing line 50 is slack. Pulling fishing line 50 taunt, as shown in FIG. 1B raises tail section 32 to a horizontal position.

As shown in FIGS. 3, 5, 9, 10, and 13, upper body section further includes an interior 30, and symmetrical right and left sides 15, 25. Each side 15, 25 has an interior face 16, 26, defining a partially hollow side interior 18, 28 for providing buoyancy to upper section 12. Right and left side hollow interiors 18, 28 may also include a ballast means 48 such as a plurality of lead weights 48 for controlling the floating and submerged depth of the lure 10 when cast into a body of water for top surface or suspended depth fishing.

Figure 12:
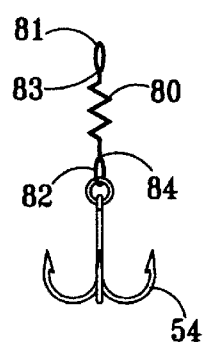
FIG. 12 is a view of the central hook of the invention attached to the supporting wire.
Figure 13:
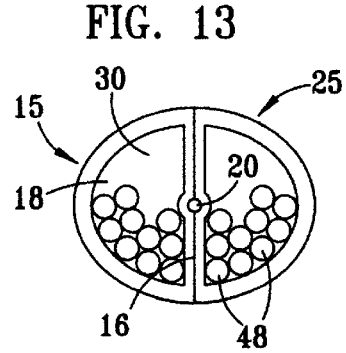
FIG. 13 is a cross-sectional view of the upper body of the present invention taken along line 13—13 of FIG. 1B, depicting the fishing line channel and partially hollow interior of the upper body section.

Interior adjacent right and left faces 16, 26 each include symmetrical elongate grooves 17, 27 and vertical grooves 19, 29 which define channels 20 and 21, respectively. Line channel 20 extends through interior 30, from an aperture 52 at the first head end 22 to an aperture 53 at second hinge end 23 for receiving a fishing line 50 through the body interior 30. Vertical channel 21 extends centrally through interior 30 between line channel 20 and exterior surface 11, near bottom 14 for retaining a center hook support wire 80 as detailed in FIG. 12.

Referring to FIGS. 3, 5, 9, 10, and 12, hook support wire 80 has an eyelet 81 at first end 83, and a tying eye 82 at second end 84. The hook wire 80 is retained within vertical channel 21, such that eyelet 81 is proximal to line channel 20 and tying eye 82 is outside external surface 11 near bottom 14. When fishing line 50 is threaded through apertures 52, 53 and line channel 20, it passes through eyelet 81. This preferred configuration including a hook 54 attached to wire 80 at tying eye 82, enables the angler to retrieve hook 54 and any attached game using line 50 even if the game damages lure body section 12. In a preferred embodiment of the invention, hook support wire 80 is fixably molded within interior 30 during the manufacturing process of body section 12.

Head end 22 additionally includes a weighted bill 24 which provides for resistance to forward movement during use. Adjacent semi-spherical chambers 44, 45 in right and left sides 15, 25 form a hollow sphere 46 for loosely retaining a weight 47. During motion of the lure 10, loose weights 47 and ballast means 48 rattle, creating an attracting sound audible to game fish. It will be understood and appreciated by those skilled in the art, that although the shape of the weight 47 and ballast 48 are spherical, both their shape and the shape of the interior chambers 18, 28, 46 may be any suitable shape which permits the loose retaining of the weights 47, 48.

Referring now to FIGS. 3, 5, 9 and 10, tail section 32 includes an interior 40 having an optional hollow chamber 57 and a counterweight chamber 58, formed by adjacent right and left sides 35, 36, and an elongate tail channel 41. Tail channel 41 extends through interior 40 to the external surface 31, defining a first aperture 42 proximal to top 33 and first hinge end 37, and a second aperture 43 proximal to the second tail end 38.

As shown in FIGS. 3, 5, 9, 10, and 11, actuator mechanism 70 includes an actuator wire 72 having a first end 73 with tying eye 75, a second end 74 with tying eye 76, and a counterweight 77 proximal to said second end. Actuator wire 72 extends through interior 40 within channel 41, having tying eye 75 of end 73 proximal to aperture 42 outside of external surface 31. Similarly, tying eye 76 of end 74 is outside external surface 31 and proximal to aperture 43. End 51 of fishing line 50 is tied to tying eye 75 and used to operate the actuator mechanism as more fully described below. In its preferred configuration, actuator wire 72 extends longitudinally through the counterweight 77.

A standard hook, such as treble hook 56 may be attached to actuator mechanism 70 at tying eye 76. As shown in the figures of the drawings, tail hook 56 includes an optional skirt 87. Commonly manufactured of a silicon or rubber, skirt 87 provides camouflage for hook 56, more accurately simulating the tail of a fish or other prey.

Figure 7:
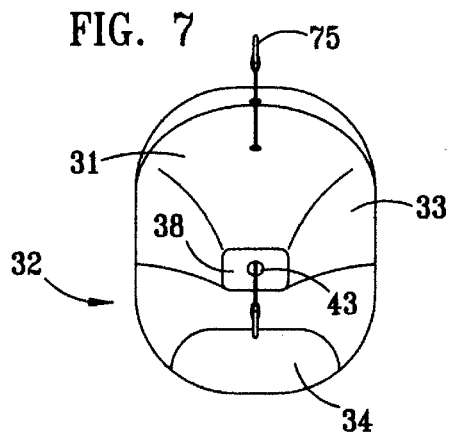
FIG. 7 is a rear plan view of the tail of the present invention, depicting the entry and exit points of the actuator wire.
Figure 8:
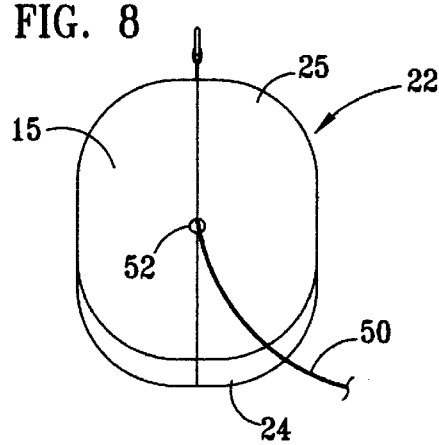
FIG. 8 is a front plan view of the upper body section of the present invention, depicting the entry and exit points of the fishing line.
Figure 9:
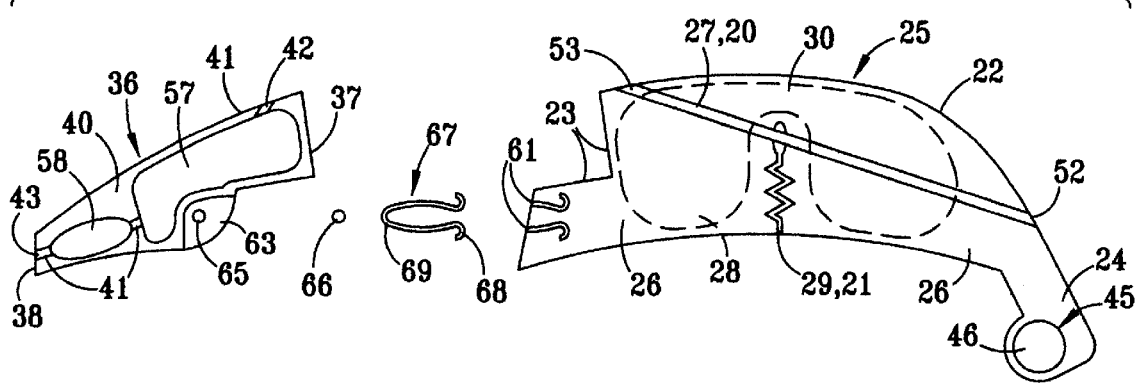
FIG. 9 is an exploded view of the left side of the present invention, depicting the interior left hollow chamber of the upper body in phantom.
Figure 10:
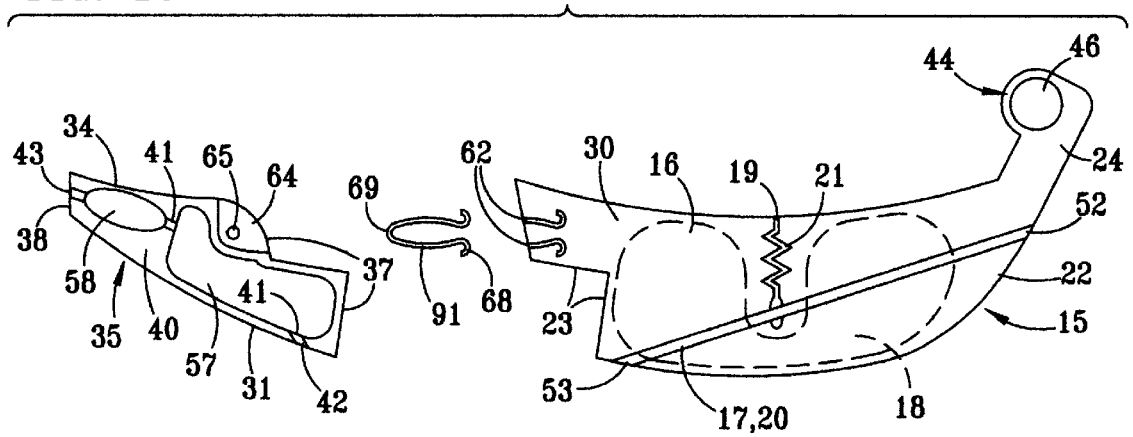
FIG. 10 is an exploded view of the right side of the present invention, depicting the interior right hollow chamber of the upper body in phantom.
Figure 11:
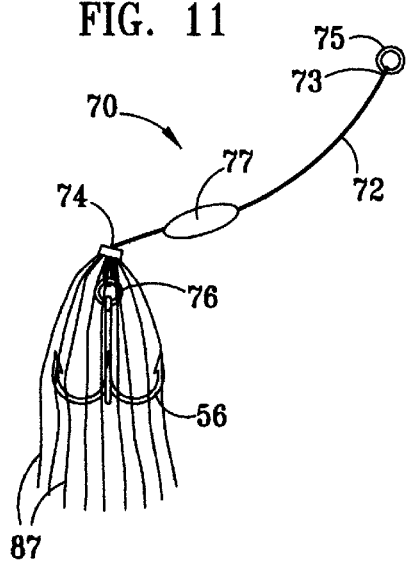
FIG. 11 is a view of the actuator mechanism of the invention attached to the tail hook.

In its preferred configuration, right and left sides 35, 36 of tail section 32 are unitarily formed as illustrated in FIGS. 4 and 7. In this configuration, tail section 32 has actuator mechanism 70, wire 72, and counterweight 77 molded within interior 40. Interior 40 may optionally be solid or include hollow chamber 57, weight chamber 58 and channel 41. Preferably, body section 12 and tail section 32 are manufactured of a plastic, such as a hard blown or molded plastic. It will be understood and appreciated by those skilled in the art, however, that lure body sections 12, 32 may be constructed of other suitable materials such as wood.

Hinge mechanism 60 provides for a pivotable connection between body section 12 and tail section 32. As shown in FIGS. 3, 5, 6, 9, and 10, first hinge end 37 of tail section 32 and second hinge end 23 of body section 12 include vertical hinge wire slots 61, 62, 63, 64 for left retaining hinge wire 67 and right retaining hinge wire 91. Left hinge wire 67 and right hinge wire 91 each include a wire formed to have an open end 68 and a loop end 69. Open ends 68 are fixably retained in wire slots 61, 62. Loop ends 69 are pivotably retained in hinge slots 63, 64, and secured into position using connection hinge pin 66. Specifically, tail section 32 further includes a horizontal hinge pin channel 65 extending though tail interior 40 and hinge wire slots 63, 64 between right and left sides 35, 36. Hinge pin 66 is retained within pin channel 65, such that it extends through loop ends 69 and hinge slots 63, 64.

With reference to FIGS. 3–10, lure body 10 is substantially conical wherein its external surface circumference is the widest at surface 11 near head end 22 and the narrowest at surface 41 near tail end 38. Tops 13 and 33 are arched in a substantially semi-spherical shape, whereas bottoms 14 and 34 are generally concave.

Referring back to FIGS. 1A–2C, the operation of the invention will now be described. Upon casting lure 10 into a body of water, lure 10 rights itself such that it simulates a wounded fish floating or submerged on its side. As shown, right side 25 includes optional eyes 86 for a more accurate simulation. When the line 50 is slack as in FIGS. 1A, 2A, and 2C, tail section 32 is in its downward, vertical. As the angler pulls line 50 taunt, tail section 32 raised to a horizontal position of FIGS. 1B and 2B, causing head end 22 to dip deeper into the water. If the angler desires to maintain the lure in a relatively stationary position, the line may be repeatedly slackened and tightened with small jerks, causing the tail 32 to flip up and down as shown in FIGS. 2A–2C. During this use, weighted bill 24 provides resistance to forward movement, and causes the head 22 to dip or bob slightly in the opposing direction of the tail section 32. This motion accurately mimics an injured fish unable to right itself. While laying on its side, the injured fish will repeatedly flip its tail up and down as per FIGS. 2A–2C, causing its head to dip in the opposite direction as it unsuccessfully attempts to right itself and swim forward through the water.

If the angler uses the lure 10 as a crank bait, the unique shape of the lure body 10 including the flat bill 24, causes the lure 10 to slowly wobble, simulating an injured fish still laying on its side but able to propel itself forward. If the retrieve action is stopped, the lure floats up to the surface or suspends and the process of tail 32 flipping or lure 10 wobbling may be resumed. Alternate casting styles, such as "walking the dog" may also be achieved using lure 10, combining the up and down motion of tail 32 with the lateral wobble motion enabled by the shape of lure 10.

It is thus believed that the operation and construction of the present invention will be apparent from the foregoing description. While the lure apparatus shown and described has been characterized as being preferred, it will be readily apparent that various changes and modifications could be made without departing from the spirit and scope of the invention as defined in the following claims.

I claim:

1. A fishing lure having a stimulated fish body, comprising:
    an elongate upper body section having an exterior surface, an interior, a right side and an interior right face defining a partially hollow right interior, a right elongate groove, and a right vertical groove, a left side and an interior left face defining a partially hollow left interior, a top, a bottom, a first head end, a second hinge end, a left elongate groove, and a left vertical groove, wherein said adjacent right and left elongate grooves form a single channel extending from an aperture at the head end to an aperture at the hinge end for receiving a fishing line having a line end, through said body interior, and wherein said adjacent right and left vertical grooves form a single vertical channel for retaining a center hook support wire;
    a lower tail section having an exterior surface, an interior, a right side, a left side, a top, a bottom, a first hinge end, a second tail end and an elongate tail channel extending through the tail interior, having a first tail channel aperture proximal to the first hinge end and the top, and a second tail channel aperture proximal to the second tail end;
    a hinge mechanism connecting said first hinge end to said second hinge end; and
    an actuator mechanism having a wire extending through said elongate tail channel, said actuator wire having a first end, and a second end, wherein said first wire end extends through said first tail channel aperture, said first wire end having a first tying eye attached, and said second wire end extends through said second tail channel aperture, said second wire end having a second tying eye attached, wherein said fishing line end is attached to the first tying eye and a hook is attached to the second tying eye.

2. The fishing lure of claim 1, wherein said first head end comprises a weighted bill.

3. The fishing lure of claim 2, wherein said right side of said body section includes a first semi-spherical chamber and said left side of said body section includes a second semi-spherical chamber in the weighted bill, said first and second chambers forming a hollow sphere for loosely retaining a weight.

4. The fishing lure of claim 1, wherein said second hinge end of said body section and said first hinge end of said tail section each have a vertical hinge wire slot, and wherein said first hinge end further comprises a horizontal hinge-pin channel extending through the tail interior and tail hinge wire slot, between the left and right sides of the tail section.

5. The fishing lure of claim 4, wherein said hinge mechanism comprises a hinge pin and a hinge wire, said hinge wire having an open end and a loop end, said open end being fixably retained in the hinge wire slot of the body section, said loop end being pivotably retained in the hinge wire slot of the tail section, and said hinge pin disposed within said hinge-pin channel securing said loop end of said hinge wire within said hinge wire tail slot.

6. The fishing lure of claim 4, wherein said first and second hinge ends further comprise two hinge wire slots.

7. The fishing lure of claim 6, wherein said hinge mechanism comprises a hinge pin, a left hinge wire and a right hinge wire, each said hinge wire having a loop end and an open end, each said open end being fixably retained in a hinge wire slot of the body section, each said loop end being pivotably retained in the hinge wire slot of the tail section, and said hinge pin disposed within said hinge-pin channel securing said loop end of each said hinge wire within each said hinge wire tail slot.

8. The fishing lure of claim 1, wherein said actuator mechanism further comprises a counterweight housed within the tail section interior, proximal to the second wire end.

9. The fishing lure of claim 8, wherein said actuator wire longitudinally extends through said counterweight.

10. The fishing lure of claim 1, wherein each said hollow left and right interior contains ballast means.

11. The fishing lure of claim 10, wherein said ballast means are a plurality of lead weights which create a sound when the lure is moved.

12. The fishing lure of claim 1, wherein said actuator mechanism is molded within said interior.

13. The fishing lure of claim 1, further comprising a center hook support wire having an eyelet at a first end and a tying eye at a second end, said hook support wire being retained in said vertical channel, wherein said support wire eyelet is proximal to said single channel.

14. The fishing lure of claim 13, wherein said fishing line retained within said line channel is threaded through the hook support wire eyelet.

15. The fishing lure of claim 13, wherein a fishing hook is tied to the tying eye of the second end of the hook support wire.

16. The fishing lure of claim 13, wherein said hook support wire is molded within the interior of the body section, having the eyelet proximal to the line channel and the tying eye proximal to the bottom and exterior surface of the body section.

17. The fishing lure of claim 1, wherein said body and tail sections comprise a hard plastic.

18. The fishing lure of claim 17, wherein said plastic is a blown plastic.

19. The fishing lure of claim 17, wherein said plastic is a molded plastic.

* * * * *